United States Patent
Fattal et al.

(10) Patent No.: US 12,032,178 B2
(45) Date of Patent: Jul. 9, 2024

(54) MULTIVIEW BACKLIGHT, DISPLAY, AND METHOD HAVING OPTICAL MASK ELEMENTS

(71) Applicant: LEIA INC., Menlo Park, CA (US)

(72) Inventors: David A. Fattal, Menlo Park, CA (US); Joseph D. Lowney, Menlo Park, CA (US); Thomas Hoekman, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 622 days.

(21) Appl. No.: 17/234,495

(22) Filed: Apr. 19, 2021

(65) Prior Publication Data

US 2021/0240005 A1    Aug. 5, 2021

Related U.S. Application Data

(63) Continuation of application No. PCT/US2019/058100, filed on Oct. 25, 2019.
(Continued)

(51) Int. Cl.
*G02B 30/33* (2020.01)
*F21V 8/00* (2006.01)
*H04N 9/31* (2006.01)

(52) U.S. Cl.
CPC .......... *G02B 30/33* (2020.01); *G02B 6/0051* (2013.01); *H04N 9/3197* (2013.01)

(58) Field of Classification Search
CPC .... G02B 30/33; G02B 6/0051; G02B 6/0055; G02B 6/0036; G02B 6/0035; G02B 6/0061; H04N 9/3197
See application file for complete search history.

(56) References Cited

U.S. PATENT DOCUMENTS 5,513,016 A * 4/1996 Inoue ................. H04N 1/40075
358/463
6,097,142 A * 8/2000 Ko ......................... H01J 29/07
313/402

(Continued)

FOREIGN PATENT DOCUMENTS

EP    3316032    5/2018
EP    3874199    9/2021
(Continued)

OTHER PUBLICATIONS

International Search Report and Written Opinion (ISRWO) by International Searching Authority (ISA) Korean Intellectual Property Office (KIPO) dated Feb. 13, 2020 (9 pages) for foreign counterpart PCT Application No. PCT/US2019/058100.
(Continued)

*Primary Examiner* — Oschta I Montoya
(74) *Attorney, Agent, or Firm* — Schwegman Lundberg & Woessner, P.A.

(57) ABSTRACT

A multiview backlight and multiview display employ an optical mask element having a first portion and a laterally displaced second portion to mitigate Moiré associated with the optical mask element. The multiview backlight includes an array of multibeam unit cells distributed across a light guide. Each multibeam unit cell has a multibeam element configured to scatter out a portion of guided light as a plurality of directional light beams having different directions corresponding to different views of the multiview display. Each multibeam unit cell further includes an optical mask element having the first portion aligned and coextensive with the multibeam element and the second portion laterally displaced within the multibeam unit cell from the first portion. One or both of the lateral displacement and
(Continued)

an overall size of the optical mask element is configured to mitigate Moiré associated with the optical mask element.

20 Claims, 9 Drawing Sheets

Related U.S. Application Data

(60) Provisional application No. 62/753,876, filed on Oct. 31, 2018.

(56) References Cited

U.S. PATENT DOCUMENTS

| | | | |
|---|---|---|---|
| 6,545,402 B1* | 4/2003 | Ko | H01J 29/076 |
| | | | 313/402 |
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,345,505 B2 | 7/2019 | Fattal | |
| 10,649,128 B2 | 5/2020 | Fattal et al. | |
| 10,705,281 B2 | 7/2020 | Fattal et al. | |
| 10,712,501 B2 | 7/2020 | Fattal | |
| 10,830,939 B2 | 11/2020 | Fattal et al. | |
| 10,928,677 B2 | 2/2021 | Aieta et al. | |
| 2002/0172031 A1 | 11/2002 | Masuda | |
| 2005/0007757 A1 | 1/2005 | Leu et al. | |
| 2005/0276073 A1 | 12/2005 | Mi et al. | |
| 2007/0201246 A1 | 8/2007 | Yeo et al. | |
| 2008/0101088 A1 | 5/2008 | Kim et al. | |
| 2008/0285310 A1 | 11/2008 | Aylward et al. | |
| 2009/0129116 A1 | 5/2009 | Kim et al. | |
| 2009/0190068 A1 | 7/2009 | Kawamura | |
| 2012/0195072 A1 | 8/2012 | Minami | |
| 2014/0126239 A1 | 5/2014 | Huang et al. | |
| 2014/0268867 A1 | 9/2014 | Fiorentino et al. | |
| 2015/0070657 A1* | 3/2015 | Said | H04N 13/307 |
| | | | 353/121 |
| 2015/0355403 A1 | 12/2015 | Santori et al. | |
| 2016/0018582 A1 | 1/2016 | Fiorentino et al. | |
| 2016/0349444 A1 | 12/2016 | Robinson et al. | |
| 2017/0075055 A1 | 3/2017 | Choi et al. | |
| 2017/0307800 A1 | 10/2017 | Fattal | |
| 2018/0120659 A1 | 5/2018 | Kim et al. | |
| 2019/0377177 A1 | 12/2019 | Takahashi et al. | |

FOREIGN PATENT DOCUMENTS

| | | |
|---|---|---|
| KR | 10-0781383 B1 | 11/2007 |
| KR | 10-2015-0128719 A | 11/2015 |
| WO | 2012038856 A1 | 3/2012 |
| WO | 2016191598 | 12/2016 |
| WO | 2017164871 A1 | 9/2017 |
| WO | 2018067381 A1 | 4/2018 |
| WO | 2018139611 | 8/2018 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

"European Application Serial No. 19878925.7, Extended European Search Report mailed Jun. 13, 2022", 9 pgs.

"European Application Serial No. 19878925.7, Response to Communication pursuant to Rules 161(2) and 162 EPC filed Dec. 10, 2021", 14 pgs.

"European Application Serial No. 19878925.7, Response filed Dec. 7, 2022 to Extended European Search Report mailed Jun. 13, 2022", 13 pgs.

* cited by examiner

MULTIVIEW BACKLIGHT, DISPLAY, AND METHOD HAVING OPTICAL MASK ELEMENTS

CROSS-REFERENCE TO RELATED APPLICATIONS

This application is a continuation application of and claims the benefit of priority to International Patent Application No. PCT/US2019/058100, filed Oct. 25, 2019, which claims priority to U.S. Provisional Application Ser. No. 62/753,876, filed on Oct. 31, 2018, the entire contents of both of which are herein incorporated by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
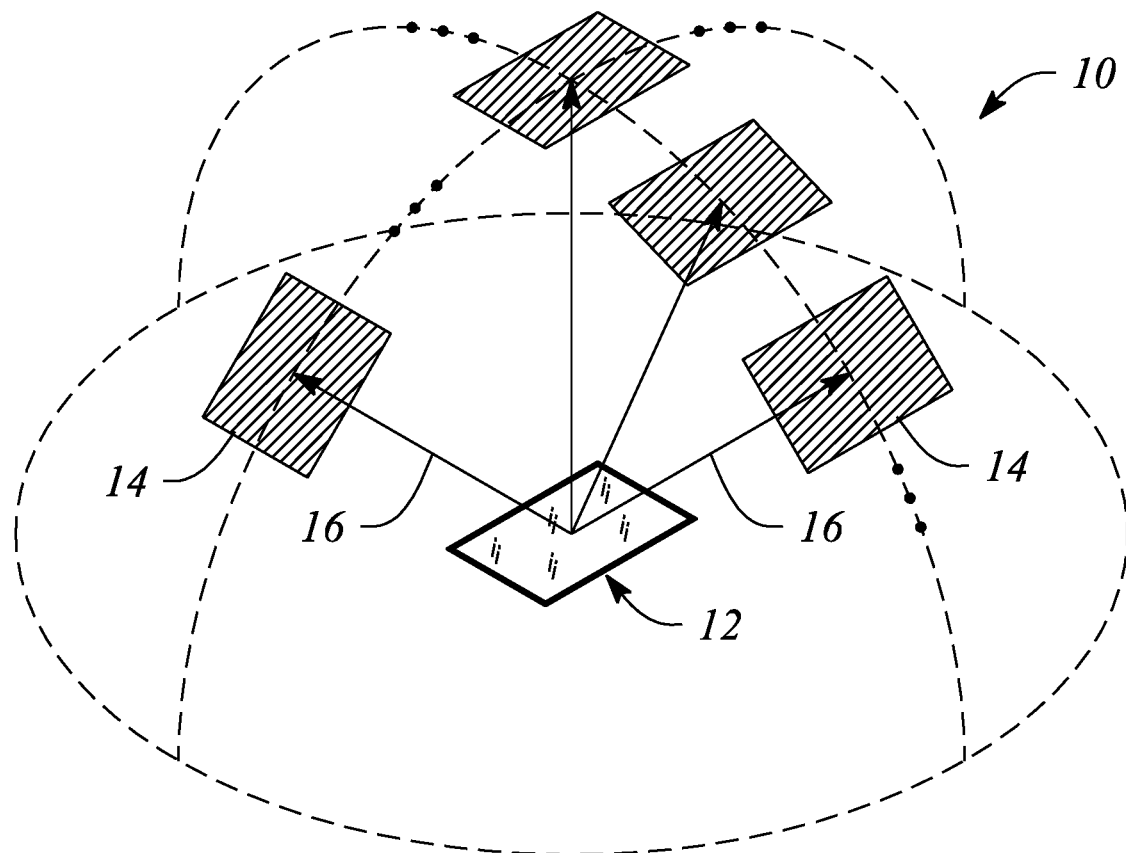
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview backlighting having applications in a multiview or three-dimensional (3D) display. Notably, the multiview backlight includes an array of multibeam unit cells distributed across a light guide. Each multibeam unit cell has a multibeam element configured to scatter out a portion of guided light as a plurality of directional light beams having different directions corresponding to different views of the multiview display. Further, each multibeam unit cell includes an optical mask element having a first portion aligned and co-extensive with the multibeam element and a second portion laterally displaced within the multibeam unit cell from the first portion of the optical mask element. According to various embodiments, an overall size of the optical mask element is configured to mitigate Moiréassociated with the optical mask element. For example, the overall size of the optical mask element, including a combined area of the first and second portions, is a non-zero integer multiple of a square of a pixel pitch of the multiview display.

According to various embodiments, the multiview display may comprise an array of light valves having the pixel pitch. The array of light valves are configured to modulate the directional light beams as a multiview image to be displayed by the multiview display, where a multiview pixel of the multiview display includes a set of light valves of the light valve array corresponding to a multibeam element of the multibeam unit cells and being configured to modulate the directional light beams scattered out by the multibeam element.

In some embodiments, multiview display that includes the multiview backlight is a mode-switchable display. During a multiview mode of operation of the mode-switchable display, the multiview backlight is used to illuminate the array of light valves and to provide multiview images. Alternatively, during a two-dimensional (2D) mode of operation of the mode-switchable display, the broad-angle backlight is used to illuminate the array of light valves and to provide a 2D image. Note that the sizes and the spatial arrangement of the first and second portions of the optical mask element in each multibeam unit cell may reduce or eliminates visibility of the optical mask elements, especially during the 2D mode of operation of the mode-switchable display, according to various embodiments.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast and herein, a 'multiview display' is defined as an electronic display or display system configured to provide different views of a multiview image in or from different view directions. In particular, the different views may represent different perspective views of a scene or object of the multiview image. Uses of multiview backlighting and multiview displays applicable to the display of multiview images described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 1B:
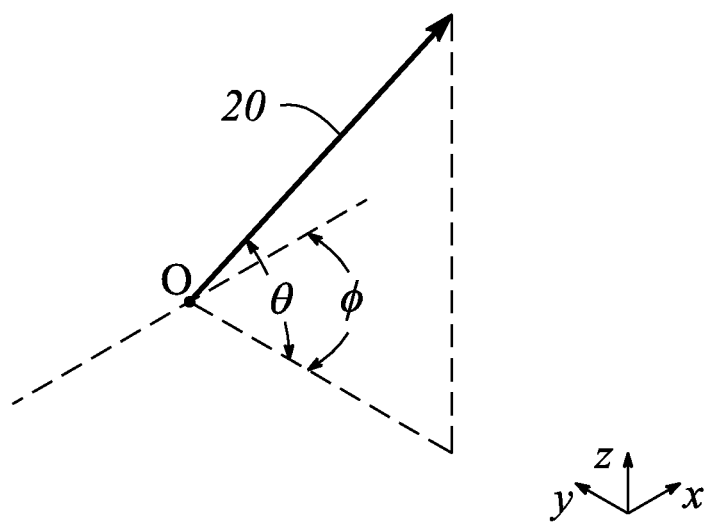
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction (i.e., a directional light beam) corresponding to a view direction of a multiview display generally has a principal angular direction given by angular components {θ, φ}, by definition herein. The angular component θ is referred to herein as the 'elevation component' or 'elevation angle' of the light beam. The angular component φ is referred to as the 'azimuth component' or 'azimuth angle' of the light beam. By definition, the elevation angle θ is an angle in a vertical plane (e.g., perpendicular to a plane of the multiview display screen while the azimuth angle φ is an angle in a horizontal plane (e.g., parallel to the multiview display screen plane). FIG. 1B illustrates a graphical representation of the angular components {θ, φ} of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set or group of light valves of a light valve array that represent view pixels in each view of a plurality of different views of a multiview display. In particular, a multiview pixel may have an individual light valve of the light valve array corresponding to or representing a view pixel in each of the different views of the multiview image. Moreover, the view pixels provided by light valves of the multiview pixel are so-called 'directional pixels' in that each of the view pixels is associated with a predetermined view direction of a corresponding one of the different views, by definition herein. Further, according to various examples and embodiments, the different view pixels represented by the light valves of a multiview pixel may have equivalent or at least substantially similar locations or coordinates in each of the different views. For example, a first multiview pixel may have individual light valves corresponding to view pixels located at $\{x_1, y_1\}$ in each of the different views of a multiview image, while a second multiview pixel may have individual light valves corresponding to view pixels located at $\{x_2, y_2\}$ in each of the different views, and so on.

In some embodiments, a number of light valves in a multiview pixel may be equal to a number of different views of the multiview display. For example, the multiview pixel may provide sixty-four (64) light valves in association with a multiview display having 64 different views. In another example, the multiview display may provide an eight by four array of views (i.e., 32 views) and the multiview pixel may include thirty-two 32 light valves (i.e., one for each view). Additionally, each different light valve may provide a view pixel having an associated direction (e.g., light beam principal angular direction) that corresponds to a different one of the view directions of the different views, for example. Further, according to some embodiments, a number of multiview pixels of the multiview display may be substantially equal to a number of view pixels (i.e., pixels that make up a selected view) in a multiview image.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'diffraction grating' is broadly defined as a plurality of features (i.e., diffractive features) arranged to provide diffraction of light incident on the diffraction grating. In some examples, the plurality of features may be arranged in a periodic manner or a quasi-periodic manner. In other examples, the diffraction grating may be a mixed-period diffraction grating that includes a plurality of diffraction gratings, each diffraction grating of the plurality having a different periodic arrangement of features. Further, the diffraction grating may include a plurality of features (e.g., a plurality of grooves or ridges in a material surface) arranged in a one-dimensional (1D) array. Alternatively, the diffraction grating may comprise a 2D array of features or an array of features that are defined in two dimensions. The diffraction grating may be a 2D array of bumps on or holes in a material surface, for example. In some examples, the diffraction grating may be substantially periodic in a first direction or dimension and substantially aperiodic (e.g., constant, random, etc.) in another direction across or along the diffraction grating.

Further, by definition herein, the features of a diffraction grating are referred to as 'diffractive features' and may be one or more of at, in and on a material surface (i.e., a boundary between two materials). The surface may be below a top surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a diffractive multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer (i.e., m=±1, ±2, ... ). A diffraction angle $\theta_m$ of a light beam produced by the diffraction grating may be given by equation (1). First-order diffraction or more specifically a first-order diffraction angle $\theta_m$ is provided when the diffraction order m is equal to one (i.e., m=1).

Figure 2:
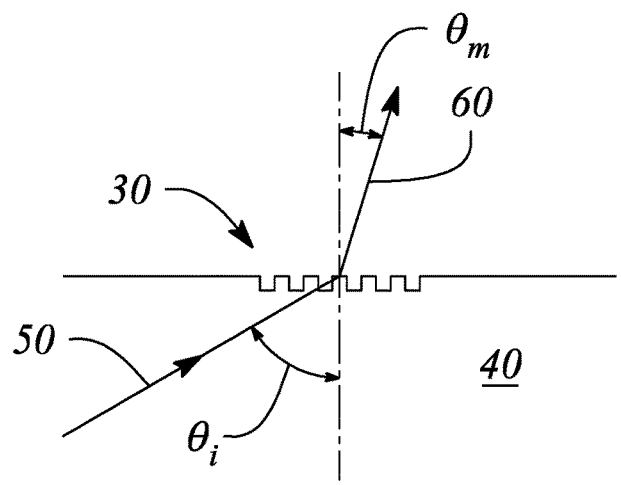
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The light beam 50 is a guided light beam within the light guide 40. Also illustrated in FIG. 2 is a directional light beam 60 diffractively produced and coupled-out or scattered-out by the diffraction grating 30 as a result of diffraction of the incident light beam 50. The directional light beam 60 has a diffraction angle $\theta_m$ (or 'principal angular direction' herein) as given by equation (1). The directional light beam 60 may correspond to a diffraction order 'm' of the diffraction grating 30, for example.

Further, the diffractive features may be curved and may also have a predetermined orientation (e.g., a slant or a rotation) relative to a propagation direction of light, according to some embodiments. One or both of the curve of the diffractive features and the orientation of the diffractive features may be configured to control a direction of light coupled-out by the diffraction grating, for example. For example, a principal angular direction of the directional light may be a function of an angle of the diffractive feature at a point at which the light is incident on the diffraction grating relative to a propagation direction of the incident light.

By definition herein, a 'multibeam element' is a structure or element of a backlight or a display that provides emitted light that includes a plurality of directional light beams. According to various embodiments, multibeam element is configured to provide the plurality of directional light beams by or using scattering, e.g., one or more of diffractive scattering, reflective scattering, refractive scattering. In particular, the multibeam element may be optically coupled to a light guide of a backlight and may employ scattering to overcome or defeat total internal reflection and thus to provide the plurality of directional light beams. Further, by definition herein, a multibeam element may comprise a plurality of sub-elements within a boundary or extent of the multibeam element. The light beams of the plurality of directional light beams (or 'directional light beam plurality') provided by a multibeam element have different principal angular directions from one another, by definition herein. In particular, by definition, a directional light beam of the directional light beam plurality has a predetermined principal angular direction that is different from that of another directional light beam of the directional light beam plurality.

In some embodiments, a multibeam element may comprise a diffraction grating or even a plurality of diffraction gratings configured to diffractively scatter light from the light guide. In other embodiments, the multibeam element may comprise one or both of a micro-reflective element and a micro-refractive element, either instead of or in addition to the diffraction grating. The micro-reflective element of the multibeam element is configured to provide reflective scattering and may include, but is not limited to, a triangular-shaped mirror, a trapezoid-shaped mirror, a pyramid-shaped mirror, a rectangular-shaped mirror, a hemispherical-shaped mirror, a concave mirror and/or a convex mirror. The micro-refractive element of the multibeam element is configured to provide refractive scattering and may include, but is not limited to, a triangular-shaped refractive element, a trapezoid-shaped refractive element, a pyramid-shaped refractive element, a rectangular-shaped refractive element, a hemispherical-shaped refractive element, a concave refractive element and/or a convex refractive element.

According to various embodiments, the directional light beam plurality may represent a light field. For example, the directional light beam plurality may be confined to a substantially conical region of space or have a predetermined angular spread that includes the different principal angular directions of the directional light beams in the directional light beam plurality. As such, the predetermined angular spread of the directional light beams in combination (i.e., the light beam plurality) may represent the light field.

According to various embodiments, the different principal angular directions of the various directional light beams in the directional light beam plurality are determined by dimensional characteristics of the multibeam element including, but not limited to, a size (e.g., one or more of length, width, area, and etc.) and an orientation of the multibeam element along with various scattering characteristics of multibeam element (e.g., diffractive grating pitch, refractive index, slope of a reflective surface, etc.). In some embodiments, the multibeam element may be considered an 'extended point light source', i.e., a plurality of point light sources distributed across an extent of the multibeam element, by definition herein. Further, a directional light beam produced by the multibeam element has a principal angular direction given by angular components $\{\theta, \phi\}$, by definition herein, and as described above with respect to FIG. 1B.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., $>\pm20°$). In other embodiments, the broad-angle emitted light cone angle may be greater than about thirty degrees (e.g., $>\pm30°$), or greater than about forty degrees (e.g., $>\pm40°$), or greater than fifty degrees (e.g., $>\pm50°$). For example, the cone angle of the broad-angle emitted light may be about sixty degrees (e.g., $>\pm60°$).

In some embodiments, the broad-angle emitted light cone angle may be defined to be about the same as a viewing angle of an LCD computer monitor, an LCD tablet, an LCD television, or a similar digital display device meant for broad-angle viewing (e.g., about $\pm40\text{-}65°$). In other embodiments, broad-angle emitted light may also be characterized or described as diffuse light, substantially diffuse light, non-directional light (i.e., lacking any specific or defined directionality), or as light having a single or substantially uniform direction.

Herein a 'collimator' is defined as substantially any optical device or apparatus that is configured to collimate light. For example, a collimator may include, but is not limited to, a diffraction grating, a collimating mirror or reflector, a collimating lens, or various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction).

Herein, a 'collimation factor,' denoted $\sigma$, is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread may be an angle determined at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein, the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'an element' means one or more elements and as such, 'the element' means 'the element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
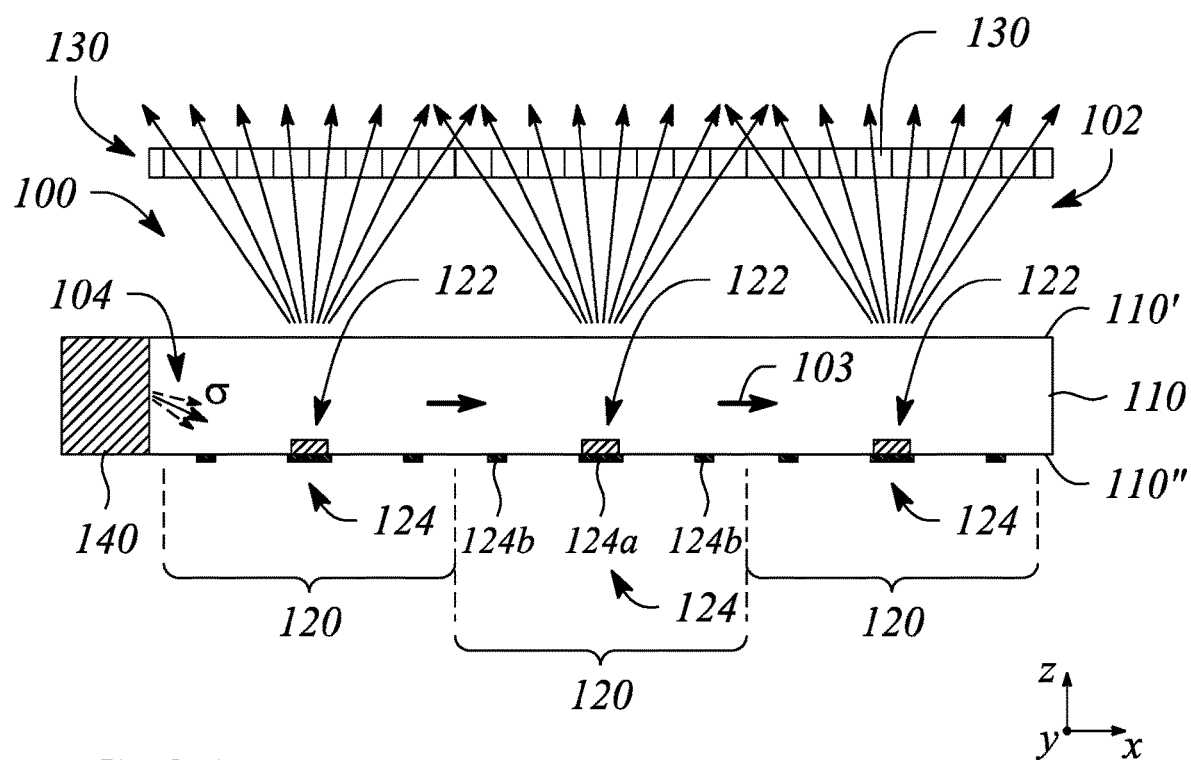
FIG. 3A illustrates a cross-sectional view of a multiview backlight in an example, according to an embodiment consistent with the principles described herein.
Figure 3B:
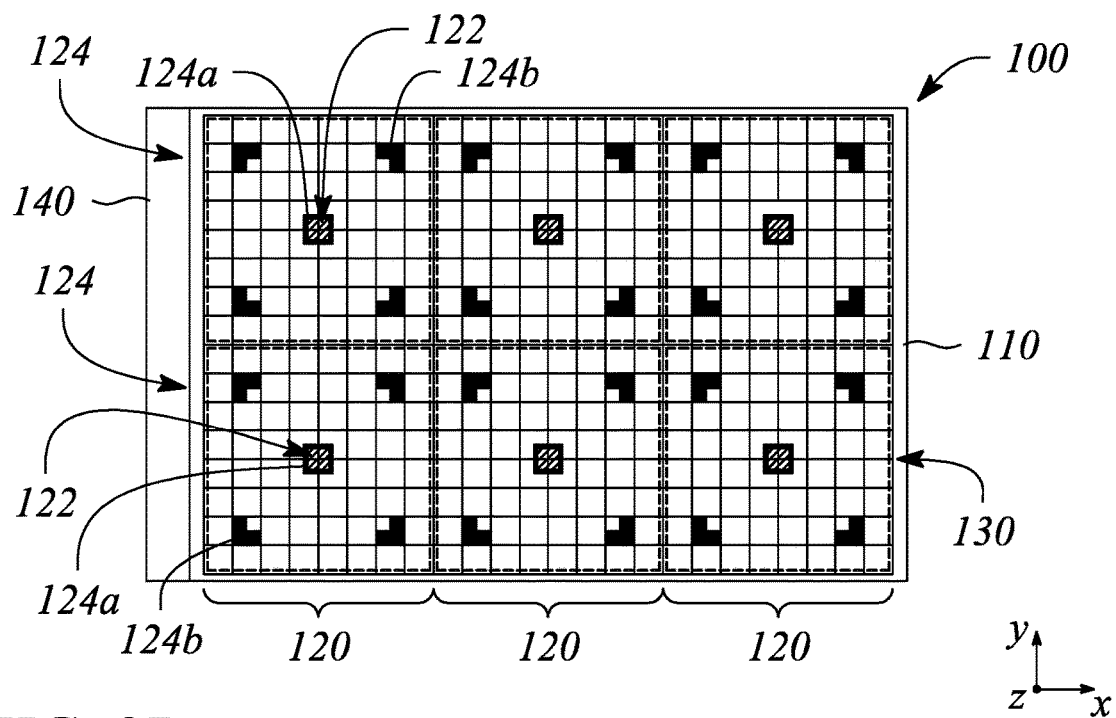
FIG. 3B illustrates a plan view of a multiview backlight in an example, according to an embodiment consistent with the principles described herein.
Figure 3C:
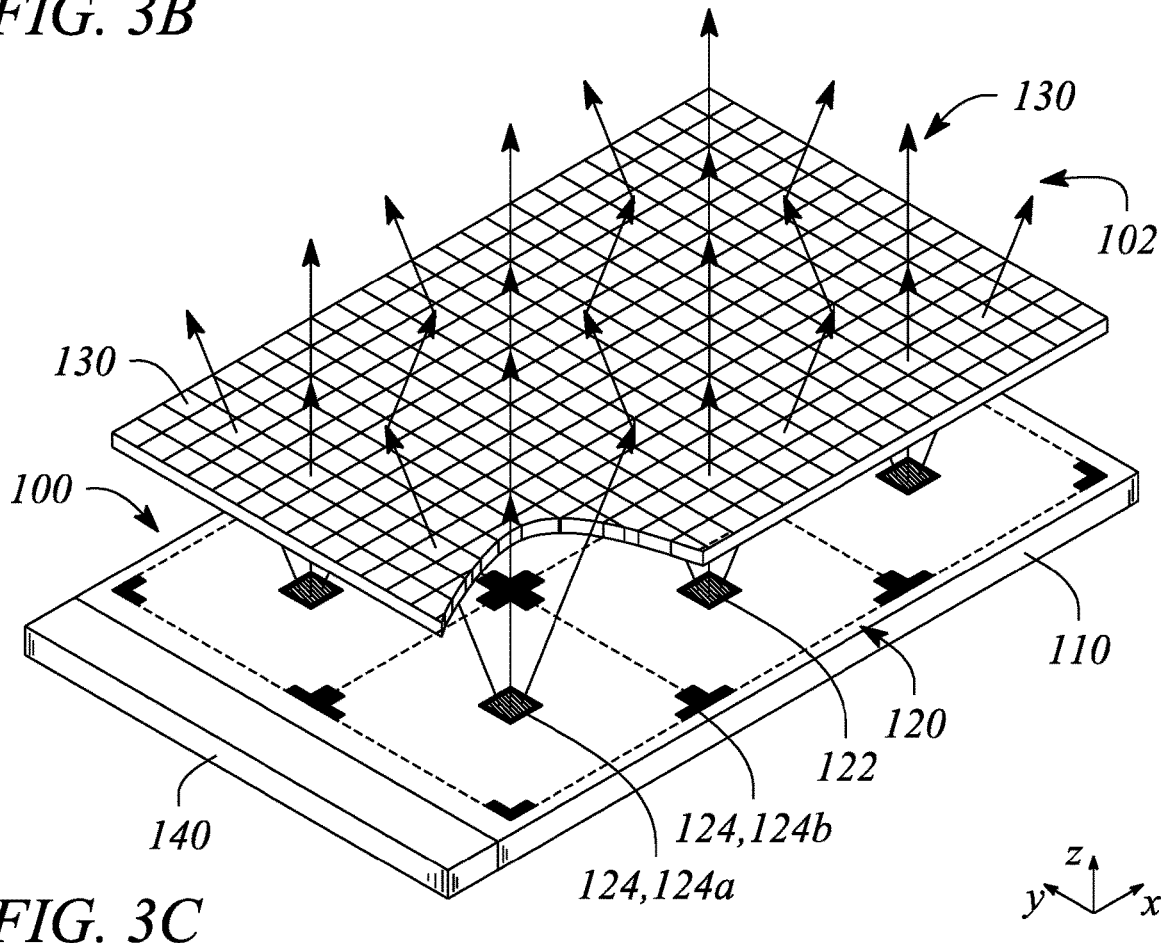
FIG. 3C illustrates a perspective view of a multiview backlight in an example, according to an embodiment consistent with the principles described herein.

According to some embodiments of the principles described herein, a multiview backlight is provided. FIG. 3A illustrates a cross-sectional view of a multiview backlight 100 in an example, according to an embodiment consistent with the principles described herein. FIG. 3B illustrates a plan view of a multiview backlight 100 in an example, according to an embodiment consistent with the principles described herein. FIG. 3C illustrates a perspective view of a multiview backlight 100 in an example, according to an embodiment consistent with the principles described herein. The perspective view in FIG. 3C is illustrated with a partial cut-away to facilitate discussion herein only.

The multiview backlight 100 illustrated in FIGS. 3A-3C is configured to provide directional light beams 102 having different principal angular directions from one another (e.g., as a light field). In particular, the provided directional light beams 102 are scattered out and directed away from the multiview backlight 100 in different principal angular directions corresponding to respective view directions of a multiview display that includes the multiview backlight 100, according to various embodiments. In some embodiments, the directional light beams 102 may be modulated (e.g., using light valves in the multiview display, as described below) to facilitate the display of information having multiview content, e.g., a multiview image. FIGS. 3A and 3C also illustrate a multiview pixel 106 comprising an array of light valves 130, which are described further below. A surface of the multiview backlight 100 through with the directional light beams 102 are scatter out of and toward the light valves 130 may be referred to as an 'emission surface' of the multiview backlight 100.

As illustrated in FIGS. 3A-3C, the multiview backlight 100 comprises a light guide 110. The light guide 110 is configured to guide light along a length of the light guide 110 as guided light 104 (i.e., a guided light beam 104). For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate optical waveguide (i.e., a plate light guide) comprising an extended, substantially planar sheet of optically transparent, dielectric material. The substantially planar sheet of dielectric material is configured to guide the guided light 104 using or according to total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light 104 according to total internal reflection at a non-zero propagation angle between a first surface 110' (e.g., 'front' or 'top' surface or side) and a second surface 110" (e.g., 'back' surface or side) of the light guide 110. In particular, the guided light 104 propagates by reflecting or 'bouncing' between the first surface 110' and the second surface 110" of the light guide 110 at the non-zero propagation angle. In some embodiments, a plurality of guided light beams comprising different colors of light may be guided by the light guide 110 as the guided light 104 at respective ones of different color-specific, non-zero propagation angles. Note, the non-zero propagation angle is not illustrated in FIGS. 3A-3C for simplicity of illustration. However, a bold arrow depicting a propagation direction 103 illustrates a general propagation direction of the guided light 104 along the light guide length in FIG. 3A.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten degrees (10°) and about fifty degrees (50°) or, in some examples, between about twenty degrees (20°) and about forty degrees (40°), or between about twenty-five degrees (25°) and about thirty-five degrees (35°). Moreover, a specific non-zero propagation angle may be chosen (e.g., arbitrarily) for a particular implementation as long as the specific non-zero propagation angle is chosen to be less than the critical angle of total internal reflection within the light guide 110.

The guided light 104 in the light guide 110 may be introduced or coupled into the light guide 110 at the non-zero propagation angle using a coupling structure such as, but not limited to, a lens, a mirror or similar reflector (e.g., a tilted collimating reflector), a diffraction grating and a prism as well as various combinations thereof. In other examples, light may be introduced directly into the input end of the light guide 110 either without or substantially without the use of a coupling structure (i.e., direct or 'butt' coupling may be employed). Once coupled into the light guide 110, the guided light 104 is configured to propagate along the light guide 110 in a propagation direction 103 that may be generally away from the input end (e.g., illustrated by bold arrows pointing along an x-axis in FIG. 3A).

Further, the guided light 104, or equivalently the guided light beam 104, produced by coupling light into the light guide 110 may be a collimated light beam, according to various embodiments. Herein, a 'collimated light' or a 'collimated light beam' is generally defined as a beam of light in which rays of the light beam are substantially parallel to one another within the light beam (e.g., the guided light beam 104). Also, by definition herein, rays of light that diverge or are scattered from the collimated light beam are not considered to be part of the collimated light beam. In some embodiments (not illustrated), the multiview backlight 100 may include a collimator, such as, but not limited to, a lens, a diffraction grating, a reflector, or a mirror to collimate the light, e.g., from a light source. In some embodiments, the light source itself comprises a collimator. The collimated light provided to and guided by the light guide 110 as the guided light 104 may be a collimated guided light beam. In particular, the guided light 104 may be collimated according to or having a collimation factor σ, in various embodiments. Alternatively, the guided light 104 may be uncollimated, in other embodiments.

As illustrated in FIGS. 3A-3C, the multiview backlight 100 further comprises an array of multibeam unit cells 120 distributed across the light guide 110. In FIGS. 3B and 3C, a multibeam unit cell 120 of the multibeam unit cell array is delineated by a dashed line. Generally, the multibeam unit cells 120 of the multibeam unit cell array have or comprise a tileable shape. For example, the multibeam unit cells 120 illustrated in FIGS. 3B-3C have a square-tileable shape. However, substantially any tileable shape may be employed, according to various embodiments. Further, the array of multibeam unit cells 120 may be arranged in a two-dimensional (2D) array as a regular array having repeating multibeam unit cells 120 across the 2D array, according to some embodiments.

According to various embodiments, each multibeam unit cell 120 of the multibeam unit cell array comprises a multibeam element 122. The multibeam element 122 is configured to scatter out of the light guide 110 a portion of the guided light 104 as a plurality of directional light beams 102 having different directions corresponding to different views of a multiview display. In particular, the multibeam element 122 may scatter the directional light beams 102 out of a surface of the light guide 110 corresponding to an emission surface of the multiview backlight 100. FIGS. 3A and 3C illustrate the directional light beams 102 as a plurality of diverging arrows depicted as being directed way from the first (or front) surface 110' of the light guide 110, i.e., the emission surface of the light guide 110, as illustrated. As such, the emission surface of the multiview backlight 100 may equivalent to an emission surface of the light guide 110 through which the directional light beams 102 are scattered by the multibeam element 122. Further, the guided light portion may be coupled out or scattered out using one or more of diffractive scattering, reflective scattering, and refractive scattering or coupling, according to various embodiments.

In particular, the multibeam element 122 may comprise a diffraction grating configured to diffractively scatter out the portion of the guided light as the plurality of directional light beams 102, in some embodiments. For example, the multibeam element 122 may comprise plurality of diffraction gratings. In another embodiment, the multibeam element 122 may comprise one or both of a micro-reflective element configured to reflectively scatter out the portion of the guided light 104 as the plurality of directional light beams 102 and a micro-refractive element configured to refractively scatter out the portion of the guided light 104 as the plurality of directional light beams 102. In yet other embodiments, the multibeam element 122 may comprise one or more of a diffraction grating, a micro-reflective element and a micro-refractive element.

According to various embodiments, each multibeam unit cell 120 of the multibeam unit cell array further comprises an optical mask element 124. The optical mask element 124 may function to reflect or at least block light scattered by the multibeam element 122 in a direction other than a direction of the directional light beams 102, for example. In particular and as is described in more detail below, the optical mask element 124 may be configured to facilitate scattered light being selectively directed toward the emission surface of the light guide 110, e.g., as opposed to being directed away from the emission surface. Moreover, when the optical mask element 124 is configured to reflect the scattered light, the reflected scattered light may augment the directional light beams 102 to improve a scattering efficiency of the multibeam element 122, according to some embodiments.

According to various embodiments, the optical mask element 124 comprises a first portion 124a aligned with and co-extensive with the multibeam element 122 of the multibeam unit cell 120 and a second portion 124b that is laterally displaced within the multibeam unit cell 120 from the first portion. According to some embodiments, the second portion 124b of the optical mask element 124 may be laterally displaced within the multibeam unit cell 120 by an integer multiple of a pixel pitch of the multiview display. That is, the second portion is separated and laterally spaced away from the first portion 124a by a lateral distance corresponding to the integer multiple of the pixel pitch, in some embodiments. In general, the lateral displacement of the second portion 124b may be in an x-direction, ay-direction, or a combination of both of the x-direction and they-direction. In other embodiments, the lateral displacement of the second portion 124b from the first portion 124a may be a non-integer multiple of the pixel pitch.

Further, an overall size of the optical mask element 124 is configured to mitigate Moiréassociated with the optical mask element 124, according to various embodiments. In some embodiments, the overall size of the optical mask element 124 comprising a combined area of the first and second portions 124a, 124b is an integer multiple of a square of the pixel pitch. In some embodiments, the first portion 124a and second portion 124b of the optical mask element 124 are coplanar with one another. In other embodiments, the first and second portions 124a, 124b are not coplanar.

In general, the optical mask element 124, or at least the first portion 124a thereof, is located on a side of the multibeam element 122 opposite to a side facing in a direction of the plurality of directional light beams 102, i.e., an emission direction. As such, the first portion 124a of the optical mask element 124 may be located between the multibeam element 122 and the second surface 110" of light guide 110 opposite to the first surface 110' of the light guide 110, in some embodiments. The first surface 110' may correspond to an emission surface through which the plurality of directional light beams 102 is configured to be emitted by the multiview backlight, as illustrated in FIGS. 3A and 3C, for example.

For example, in some embodiments the multibeam element 122 of the multibeam unit cell 120 may be disposed on the first surface 110' of the light guide 110, e.g., top surface as illustrated. In turn, the optical mask element 124 of the multibeam unit cell 120 may be located between the multibeam element 122 and the second surface of the light guide 110. That is, at least the first portion 124a of the optical mask element 124 may be located adjacent to a side of the multibeam element 122 opposite to a side facing the first surface 110' of the light guide 110. In other embodiments, the multibeam elements 122 may be disposed on the second surface 110" or even between the first and second surfaces 110', 110". In these examples, the optical mask element 124 may be located between the multibeam element 122 and the second surface 110" of the light guide 110 or even outside of the light guide 110.

Figure 4A:
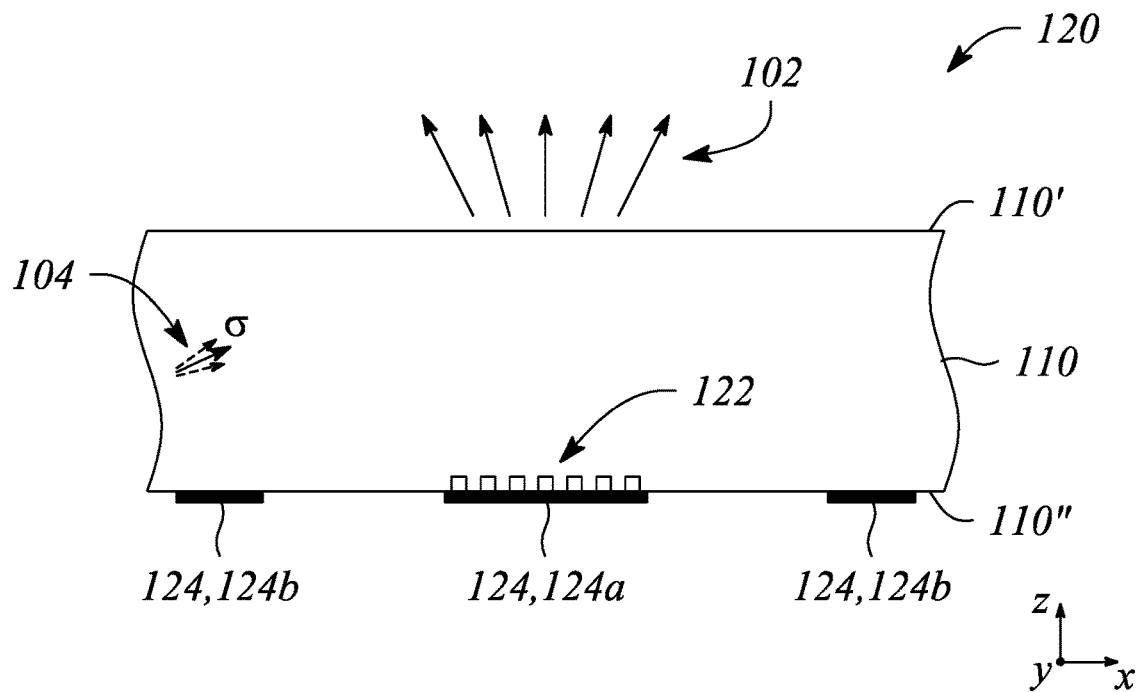
FIG. 4A illustrates a cross sectional view of a multibeam unit cell in and example, according to an embodiment consistent with the principles described herein.

FIG. 4A illustrates a cross sectional view of a multibeam unit cell 120 in and example, according to an embodiment consistent with the principles described herein. As illustrated in FIG. 4A, the multibeam element 122 of the multibeam unit cell 120 is located adjacent to the second surface 110" of the light guide 110. Further, the optical mask element 124 of the multibeam unit cell 120 is located adjacent to a side of the multibeam element 122, opposite to a side thereof facing the first surface 110' or emission surface of the light guide 110, as illustrated. The illustrated optical mask element 124 has a first portion 124a that is aligned and co-extensive with the multibeam element 122 and a second portion 124b including two sub-portions that are each laterally displaced from the first portion 124a, but in different directions. Also, the first portion 124a and second portion 124b are coplanar with one another, as illustrated.

Figure 4B:
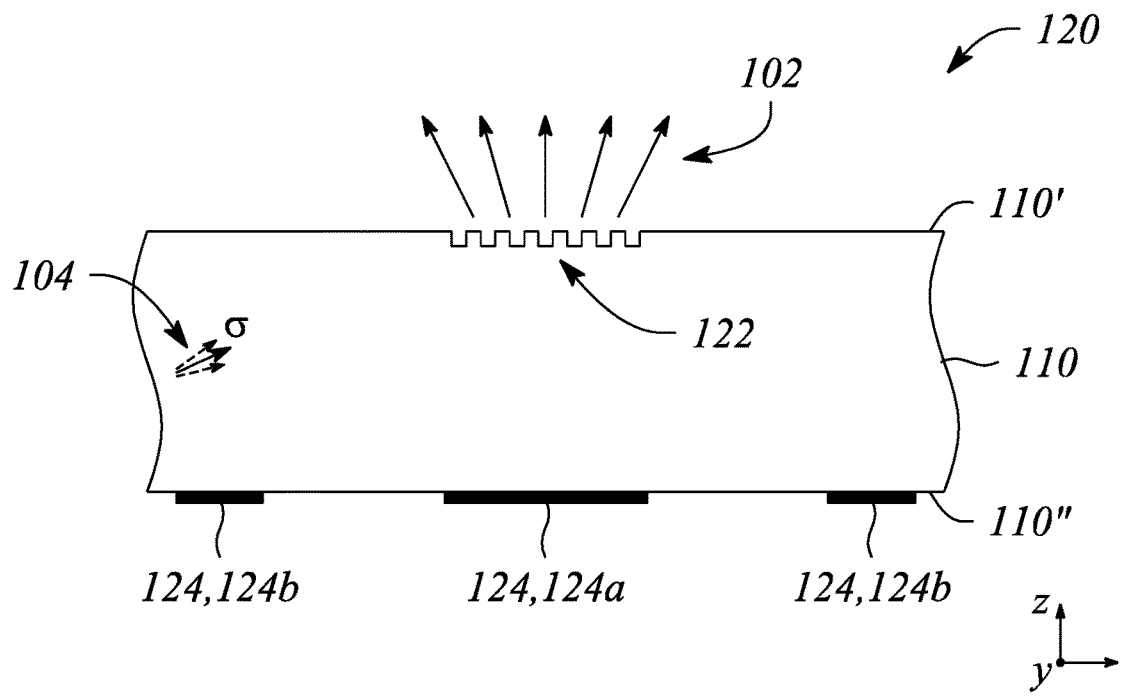
FIG. 4B illustrates a cross sectional view of a multibeam unit cell in an example, according to another embodiment consistent with the principles described herein.

FIG. 4B illustrates a cross sectional view of a multibeam unit cell 120 in an example, according to another embodiment consistent with the principles described herein. As illustrated in FIG. 4B, multibeam element 122 of the multibeam unit cell 120 is adjacent to the second surface 110" of the light guide 110. Further, the optical mask element 124 is adjacent to a side of the multibeam element 122 opposite to a side facing the first surface of the light guide, i.e., a direction in which the directional light beams 102 are scattered by the multibeam element 122. In FIG. 4B, the optical mask element 124 may be applied or affixed to the second surface 110" of the light guide 110 and thus be effectively located outside of the light guide 110, according to some embodiments. Again, as in FIG. 4A, the first and second portions 124a, 124b are coplanar and the first portion 124a is aligned and co-extensive with the multibeam element 122 of the illustrated multibeam unit cell 120. Moreover, in FIG. 4B, the multibeam element 122 is also illustrated as a diffraction grating, by way of example and not limitation.

Figure 4C:
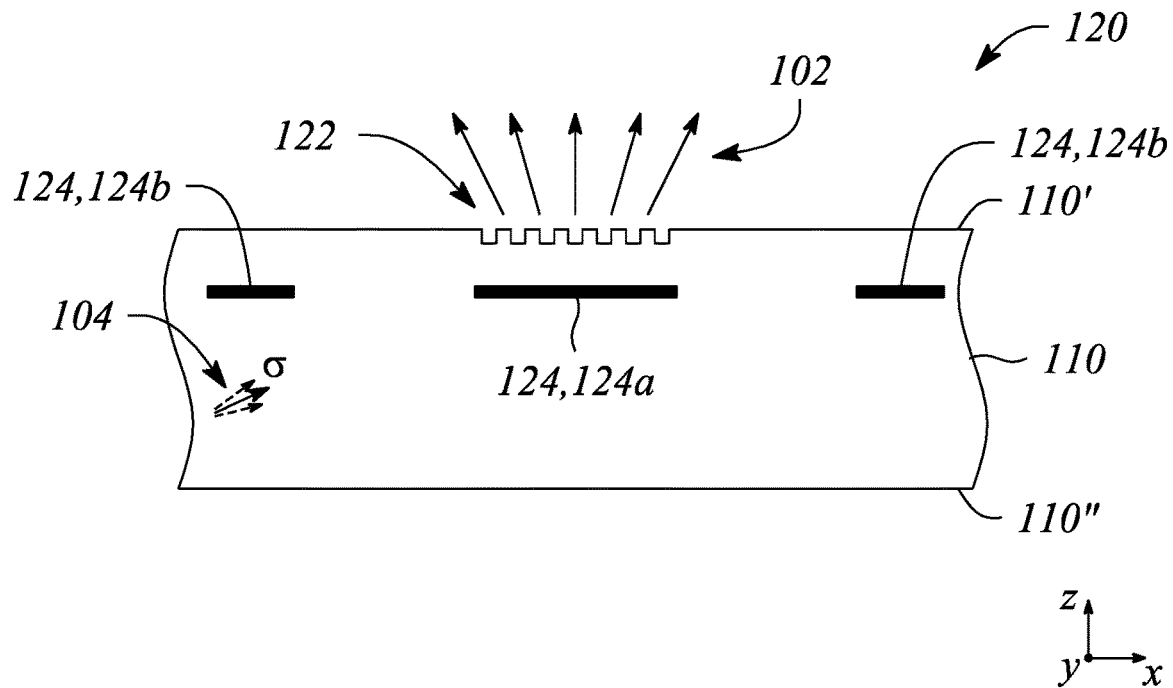
FIG. 4C illustrates a cross sectional view of a multibeam unit cell in an example, according to another embodiment consistent with the principles described herein.

FIG. 4C illustrates a cross sectional view of a multibeam unit cell 120 in an example, according to another embodiment consistent with the principles described herein. In FIG. 4C, the multibeam element 122 is located adjacent to the first surface 110' of the light guide 110 and the optical mask element 124 is located between the first surface 110' and the second surface 110". Again, as in FIG. 4A, the first and second portions 124a, 124b are coplanar and the first portion 124a is aligned and co-extensive with the multibeam element 122 of the illustrated multibeam unit cell 120. In FIG. 4C, the multibeam element 122 is also illustrated as a diffraction grating configured to diffractively scatter the guided light 104 out of the light guide 110 as the directional light beams 102, by way of example and not limitation.

Figure 4D:
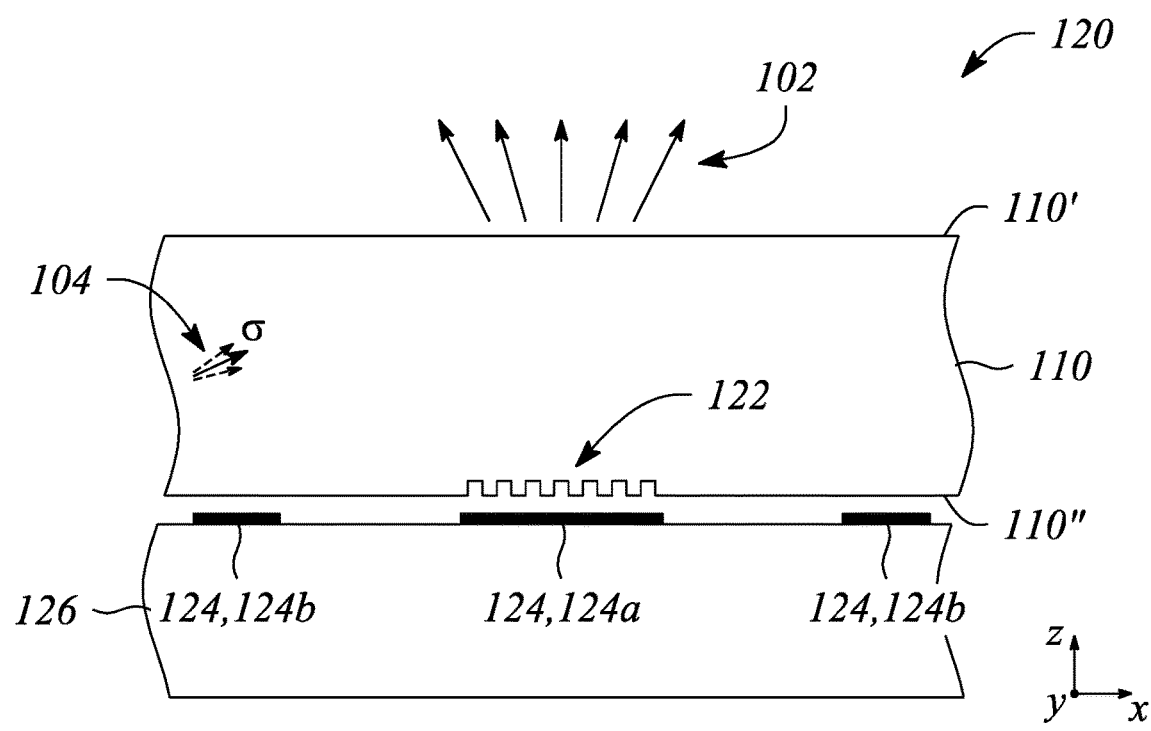
FIG. 4D illustrates a cross sectional view of a multibeam unit cell in an example, according to yet another embodiment consistent with the principles described herein.

FIG. 4D illustrates a cross sectional view of a multibeam unit cell 120 in an example, according to yet another embodiment consistent with the principles described herein. As illustrated in FIG. 4D, multibeam element 122 of the multibeam unit cell 120 is adjacent to the second surface 110" of the light guide 110. Further, the optical mask element 124 is adjacent to a side of the multibeam element 122 opposite to a side facing the first surface of the light guide, i.e., a direction in which the directional light beams 102 are scattered by the multibeam element 122. However, as illustrated in FIG. 4D, the optical mask element 124 is located on a surface of another structure 126 adjacent to the light guide 110. For example, the other structure 126 may comprise another backlight such as a broad-angle backlight described below. Further, the optical mask element is separated by a gap (e.g., an air gap) from the multibeam element 122, illustrated in FIG. 4D by way of example and not limitation.

Note that in each of FIGS. 4A-4D, the multibeam element 122 is illustrated as a diffraction grating, by way of example and not limitation. The multibeam element 122 in FIGS. 4A-4D could equally well have been illustrated as either a micro-refractive element or a micro-reflective element, for example. Likewise, FIGS. 4A-4D illustrate the first and second portions 124a, 124b of the optical mask element 124 as being coplanar for ease of illustration and not by way of limitation. Further, directional light beams 102 diffractively scattered by the diffraction grating of the multibeam element 122 from the guided light 104 are illustrated being emitted at the first surface 110' of the light guide 110 in FIGS. 4A-4D.

According to various embodiments, the optical mask element 124 is opaque and comprises an opaque material (e.g., a material layer or film) configured to block or at least substantially block transmission of light. As such, the optical mask element 124 may be referred to as an opaque mask element. In some embodiments, at least the second portion 124b of the optical mask element comprises an opaque material. In other embodiments, both the first and second portions 124a, 124b of the optical mask element 124 comprise an opaque material. As such, the opaque material may be configured to block light scattered by the multibeam element 122 in a direction that is substantially away from the emission surface of the light guide. In some embodiments, the opaque material may be configured to merely block the transmission of the light, while in other embodiments the opaque material may comprise a layer or film that absorbs incident light, e.g., a black paint or film.

In some embodiments, the optical mask element 124 comprises a reflective material and the optical mask element 124 may be referred to as a reflective mask element. In particular, at least the first portion 124a of the optical mask element 124 may comprise a reflective material configured to reflect scattered light from the multibeam element 122 in a direction corresponding to the scattered out a portion of the guided light or equivalently toward the emission surface of the light guide 110. Both the first and second portions 124a, 124b may comprise the reflective material, in some embodiments. In other embodiments, the first portion 124a of the optical mask element 124 may comprise the reflective material therefore be reflective, while the second portion 124b may be merely opaque comprising an absorptive material, for example. According to various embodiments, the reflective material may include, but is not limited to, a metal (e.g., a reflective metal layer or film), various polymer-metal composites (e.g., an aluminum-polymer layer or film), a Bragg reflector, an enhanced specular reflectors films (ESR), or any of a variety of other suitable materials and material layers or film that provide optical reflection.

Referring again to FIGS. 3A-3C, the multibeam elements 122 being located entirely within the multibeam unit cells 120 are spaced apart from one another along the light guide length, and in some embodiments across a width of the light guide 110. In particular, the multibeam elements 122 of the multibeam unit cell array are collectively separated from one another by a finite space and represent individual, distinct elements along the light guide length. Therefore and by definition herein, the multibeam elements 122 of the array of multibeam unit cells 120 are spaced apart from one another according to a finite (i.e., non-zero) inter-element distance (e.g., a finite center-to-center distance). Further, the multibeam elements 122 of the plurality generally do not intersect, overlap or otherwise touch one another, according to some embodiments. Moreover, each multibeam element 122 is generally distinct and separated from other ones of the multibeam elements 122, since each multibeam element 122 is in a different multibeam unit cell 120.

According to some embodiments, a size of the multibeam element 122 may be comparable to a size of a light valve or equivalently of a pixel of a multiview display in which the multiview backlight 100 is employed. Herein, the 'size' may be defined in a variety of manners to include, but not be limited to, a length, a width or an area. For example, the light valve size may be a length thereof and the comparable size of the multibeam element 122 may also be a length of the multibeam element 122. In another example, the size may refer to an area such that an area of the multibeam element 122 may be comparable to an area of the light valve.

In some embodiments, the size of the multibeam element 122 of a multibeam unit cell 120 is comparable to the light valve size such that the multibeam element size is between about fifty percent (50%) and about two hundred percent (200%) of the light valve size. For example, if the multibeam element size is denoted 's' and the light valve size is denoted 'S" (e.g., as illustrated in FIG. 3A), then the multibeam element size s may be given by equation (2) as $$\frac{1}{2}S \le s \le 2S \qquad (2)$$

According to some embodiments, the comparable sizes of the multibeam element 122 and the light valve 130 may be chosen to reduce, or in some examples to minimize, dark zones between views of the multiview display. Moreover, the comparable sizes of the multibeam element 122 and the light valve 130 may be chosen to reduce, and in some examples to minimize, an overlap between views (or view pixels) of a multiview display or of a multiview image displayed by the multiview display.

As mentioned above, the multiview backlight 100 illustrated in FIGS. 3A-3C may be employed in a multiview display that further comprises a light valve array configured to modulate the directional light beams 102 as a multiview image. FIGS. 3A and 3C illustrate an array of light valves 130 located adjacent the first surface 110' of the light guide 110 of the multiview backlight 100. As illustrated, different ones of the directional light beams 102 having different principal angular directions pass through and may be modulated by different ones of the light valves 130 in the light valve array. Further, as illustrated, a set of the light valves 130 corresponds to a multiview pixel 106 of the multiview display, and a selected light valve 130 of the set corresponds to a pixel of the multiview display. In particular, a different set of light valves 130 of the light valve array is configured to receive and modulate the directional light beams 102 from each of the multibeam elements 122, i.e., there is one unique set of light valves 130 for each multibeam unit cell 120, as illustrated. In various embodiments, different types of light valves may be employed as the light valves 130 of the light valve array including, but not limited to, one or more of liquid crystal light valves, electrophoretic light valves, and light valves based on electrowetting.

Note that, as illustrated in FIG. 3A, the size of a light valve 130 and also a size of a pixel may correspond to a physical size of a light valve 130 in the light valve array. In other examples, the light valve size may be defined as a distance (e.g., a center-to-center distance) between adjacent light valves 130 of the light valve array. For example, an aperture of the light valves 130 may be smaller than the center-to-center distance between the light valves 130 in the light valve array. Thus, the light valve size may be defined as either the size of the light valve 130 or a size corresponding to the center-to-center distance between the light valves 130, according to various embodiments. In some embodiments, the center-to-center distance between the light valves 130 may be defined as a 'pixel pitch', and an area of light valves 130 based on the center-to-center distance may be defined as a 'square of the pixel pitch'. In some embodiments where the light valves 130 comprise sub-pixels (e.g., color sub-pixels), the 'pixel pitch' may be defined in terms of the sub-pixel size or spacing, i.e., a center-to-center distance between sub-pixels of the light valve 130. For example, the light valve 130 may comprise a set of three, color sub-pixels, each of three different colors (e.g., red, green, blue) being represented by a different one of the three color sub-pixels. In this example, the pixel pitch may be defined in terms of an inter-pixel distance between color sub-pixels. In other embodiments, the light valve 130 may represent the sub-pixel and the array of light valves 130 may correspond to an array of sub-pixels.

According to some embodiments, the multiview backlight 100 may further comprise a light source 140 configured to provide the light to be guided within light guide 110. In particular, the light source 140 may be located adjacent to an entrance surface or end (input end) of the light guide 110, as illustrated in FIGS. 3A and 3C. In various embodiments, the light source 140 may comprise substantially any source of light (e.g., optical emitter) including, but not limited to, an LED, a laser (e.g., laser diode) or a combination thereof. In some embodiments, the light source 140 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 140 may be a substantially broadband light source configured to provide substantially broadband or polychromatic light. For example, the light source 140 may provide white light. In some embodiments, the light source 140 may comprise a plurality of different optical emitters configured to provide different colors of light.

In various embodiments, light source 140 is configured to provide the guided light 104, wherein the guided light 104 has one or both of a non-zero propagation angle and is collimated according to a predetermined collimation factor. In some embodiments, the light source 140 may be configured to provide light having different, color-specific, non-zero propagation angles of the guided light corresponding to each of different colors of light. In some embodiments, the light source 140 may further comprise a collimator being configured to provide light to be guided by the light guide 110 according to the predetermined collimation factor.

According to some embodiments, the multiview backlight 100 may be employed in a multiview display that also operates, functions or serves as a mode-switchable display. In these embodiments, the multiview backlight 100 may be used in conjunction with a broad-angle backlight to provide emitted light to a light valve array.

Figure 5:
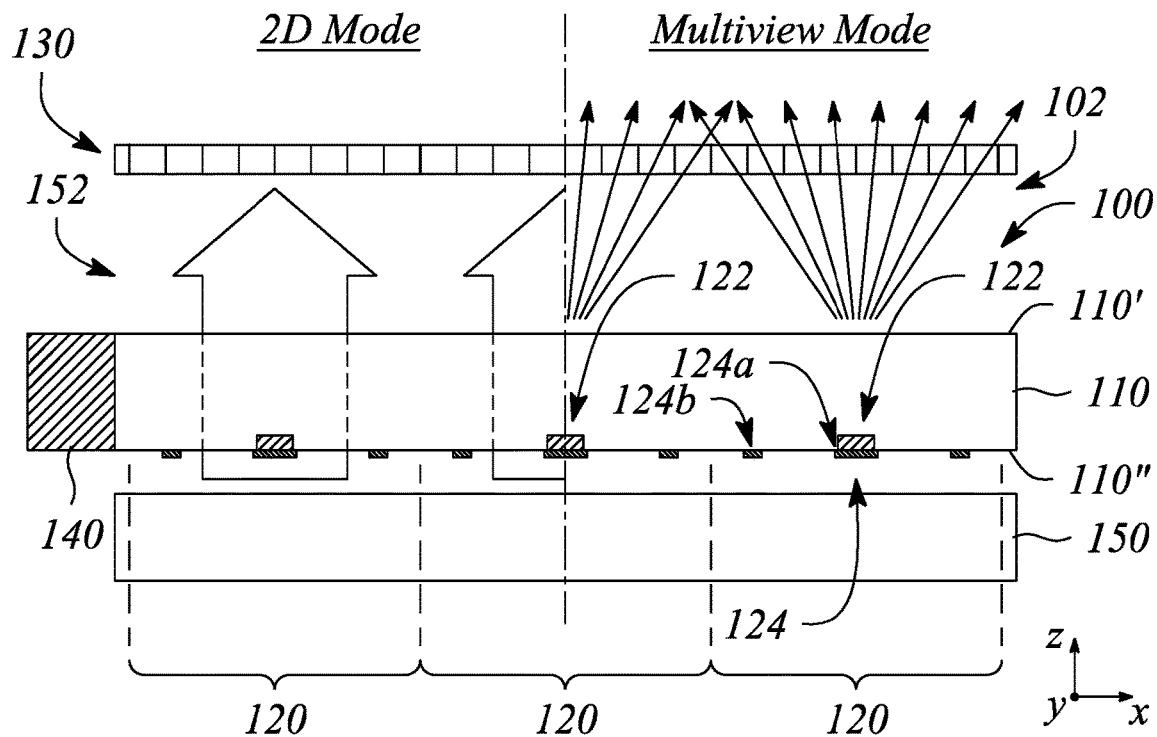
FIG. 5 illustrates a cross-sectional view of the multiview backlight along with an adjacent broad-angle backlight in an example, according to an embodiment consistent with the principles described herein.

FIG. 5 illustrates a cross-sectional view of the multiview backlight 100 along with an adjacent broad-angle backlight 150 in an example, according to an embodiment consistent with the principles described herein. In particular, the broad-angle backlight 150 is adjacent to a surface (i.e., the second or bottom surface 110") of the light guide 110 of the multiview backlight 100, as illustrated. The broad-angle backlight 150 is configured to provide broad-angle emitted light 152 to the array of light valves 130, according to various embodiments. In particular, the broad-angle backlight 150 is configured to provide broad-angle emitted light 152 during a two-dimensional (2D) mode of the multiview display, the light valve array being configured to modulate the broad-angle emitted light as a 2D image. Accordingly, the light guide 110 and the array of multibeam unit cells 120 are configured to be transparent to the broad-angle emitted light 152. In various embodiments, the multiview display is configured to display the multiview image during a multiview mode and the 2D image during the 2D mode of the multiview display. In FIG. 5, the multiview backlight 100 further comprises the multibeam unit cells 120 with both the multibeam elements 122 and the optical mask elements 124, as illustrated.

According to various embodiments, the above-described lateral displacement of the second portion 124b of the optical mask element 124 from the first portion 124a may reduce or minimize visibility of the optical mask element 124, especially when a second backlight such as the broad-angle backlight 150 is employed. In particular, one or both of visibility of the optical mask element 124 may be minimized and Moiréassociated with the optical mask element 124 may be mitigated by the lateral displacement, in some embodiments. Further, the visibility minimization and Moirémitigation may be particularly important when light from another source (e.g., another coplanar backlight) is configured to pass through the multiview backlight 100, according to some embodiments. According to various embodiments, the second portions 124b of the optical mask elements 124 may have any of a variety of shapes. Further, a distribution of multibeam unit cells 120 across the multibeam unit cell array may result in second portions 124b of adjacent multibeam unit cells 120 merging with one another for form various shapes.

Figure 6A:
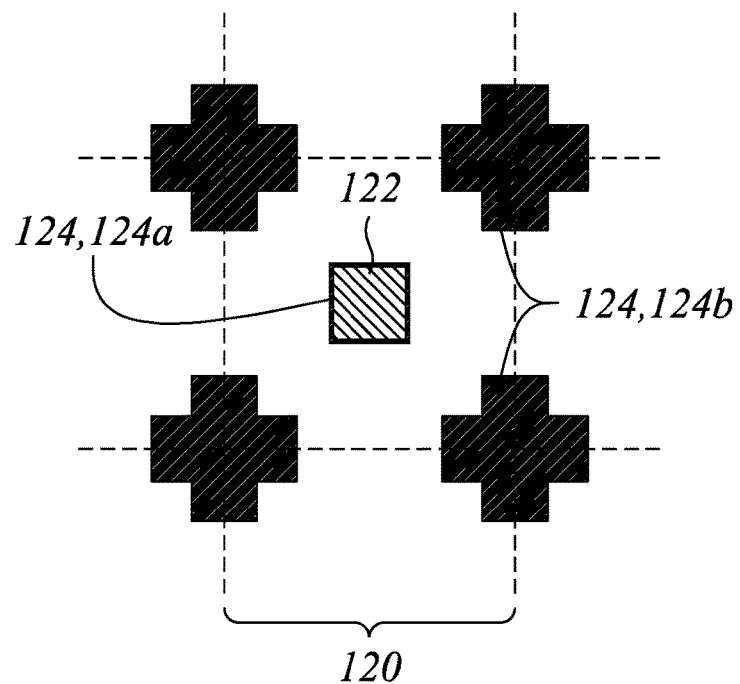
FIG. 6A illustrates plan view of a multibeam unit cell in an example, according to an embodiment consistent with the principles described herein.

FIG. 6A illustrates plan view of a multibeam unit cell 120 in an example, according to an embodiment consistent with the principles described herein. In particular, FIG. 6A illustrates the multibeam unit cell 120 comprising the multibeam element 122 and the optical mask element 124 in an array of multibeam unit cells 120, the optical mask element 124 comprising a first portion 124a and a plurality of second portions 124b that are laterally displaced from the first portion 124a. As illustrated, the laterally displaced second portions 124b of optical mask elements 124 in adjacent multibeam unit cells 120 merge at corners thereof to form a cross shape. Further, an overall size of the combined first and second portions 124a, 124b is equal to an integer multiple of a square of the pixel pitch a multiview display, as illustrated.

Figure 6B:
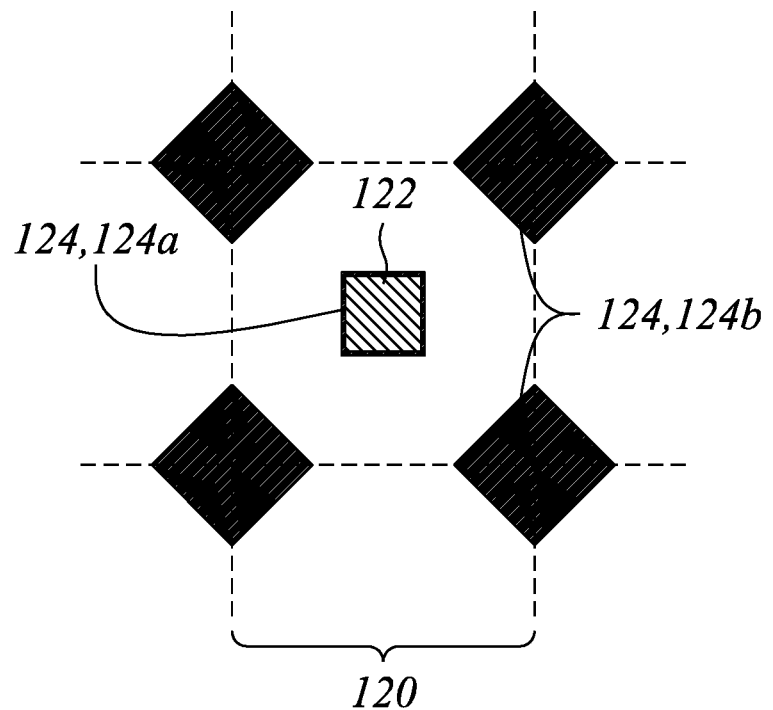
FIG. 6B illustrates plan view of a multibeam unit cell in an example, according to another embodiment consistent with the principles described herein.

FIG. 6B illustrates plan view of a multibeam unit cell 120 in an example, according to another embodiment consistent with the principles described herein. The multibeam unit cell 120 illustrated in FIG. 6B comprises the multibeam element 122 and the optical mask element 124 in an array of multibeam unit cells 120. Further, the second portions 124b of optical mask elements 124 are laterally displaced from the first portion 124a and have triangular shapes, as illustrated.

As such, second portions 124b of optical mask elements 124 in adjacent multibeam unit cells 120 merge at corners thereof to form diamond shapes.

Figure 6C:
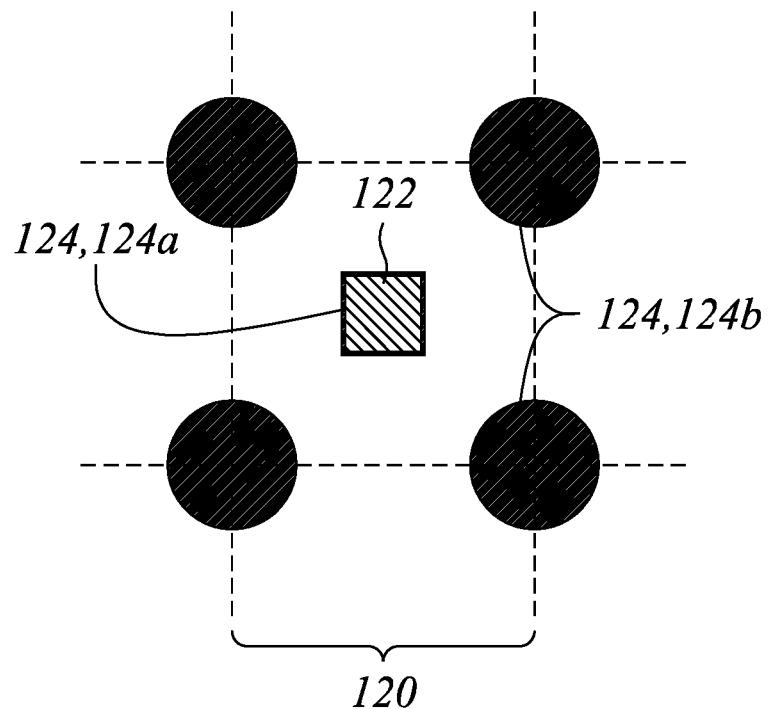
FIG. 6C illustrates plan view of a multibeam unit cell in an example, according to another embodiment consistent with the principles described herein.

FIG. 6C illustrates plan view of a multibeam unit cell 120 in an example, according to another embodiment consistent with the principles described herein. In FIG. 6C, the illustrated multibeam unit cell 120 comprises the multibeam element 122 and the optical mask element 124 in an array of multibeam unit cells 120, as in FIGS. 6A-6B. However, the second portions 124b of optical mask elements 124 laterally displaced from the first portion 124a have semi-circular shapes in FIG. 6C. As such, laterally displaced second portions 124b of adjacent multibeam unit cells 120 merge at corners thereof to form circular shapes.

Figure 6D:
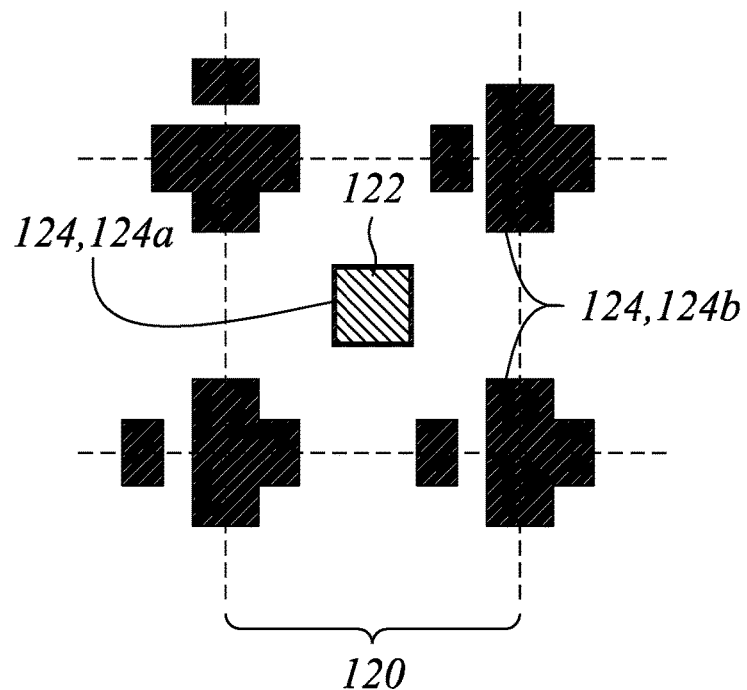
FIG. 6D illustrates plan view of a multibeam unit cell in an example, according to another embodiment consistent with the principles described herein.

FIG. 6D illustrates plan view of a multibeam unit cell 120 in an example, according to another embodiment consistent with the principles described herein. As with FIGS. 6A-6C, the multibeam unit cell 120 illustrated in FIG. 6D comprises the multibeam element 122 and the optical mask element 124 in an array of multibeam unit cells 120. In FIG. 6D however, the laterally displaced second portions 124b of optical mask elements 124 have substantially arbitrary or random shapes. For example, the second portions 124b illustrated in FIG. 6D may comprise the second portions 124b illustrated in FIG. 6A, but with regions being randomly removed. Note however that the overall size of the second portions 124b illustrated in FIG. 6D is still configured to mitigate Moiréassociated with the optical mask element, e.g., the overall size of the second portion 124b when combined with the first portion 124a is still an integer multiple of a square of the pixel pitch.

In accordance with some embodiments of the principles described herein, a multiview display is provided. The multiview display is configured to emit and modulate directional light beams as pixels of the multiview display or equivalently pixels of a multiview image displayed by the multiview display. The emitted and modulated directional light beams have different principal angular directions from one another (also referred to as 'differently directed light beams' herein). Further, the emitted, modulated light beams may be preferentially directed toward a plurality of viewing directions of the multiview display or equivalently of the multiview image.

Figure 7:
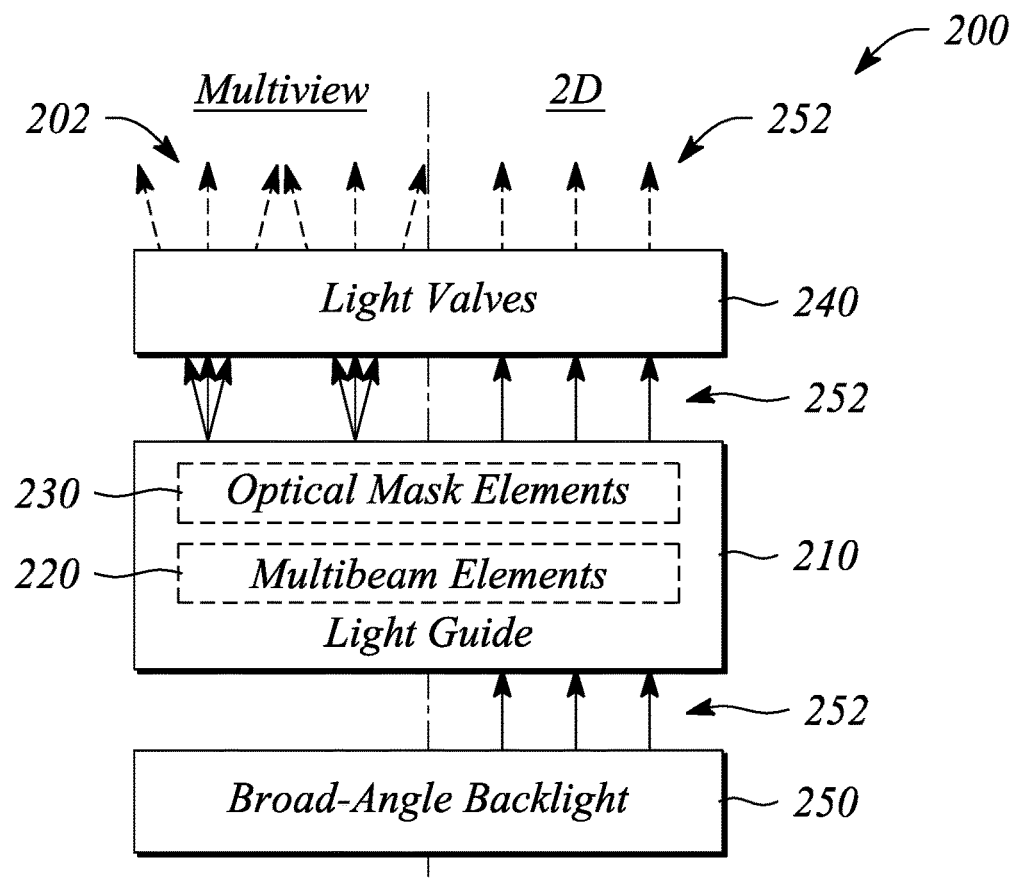
FIG. 7 illustrates a block diagram of a multiview display in an example, according to an embodiment consistent with the principles described herein.

FIG. 7 illustrates a block diagram of a multiview display 200 in an example, according to an embodiment consistent with the principles described herein. According to various embodiments, the multiview display 200 is configured to display a multiview image having different views in different view directions. In particular, modulated light beams 202 emitted by the multiview display 200 are used to display the multiview image having a plurality of pixels (e.g., view pixels) corresponding to each of the different views. The modulated light beams 202 are illustrated as arrows emanating from the multiview display 200 in FIG. 7. Dashed lines are used for the arrows of the emitted modulated light beams 202 to emphasize the modulation thereof by way of example and not limitation.

As illustrated, the multiview display 200 comprises a light guide 210 configured to guide light. The light may be provided by a light source (not illustrated) and then guided within the light guide 210 as guided light according to total internal reflection, in various embodiments. In some embodiments, the light guide 210 of the multiview display 200 may be substantially similar to the light guide 110 described above with respect to the multiview backlight 100.

The multiview display 200 illustrated in FIG. 7 further comprises an array of multibeam elements 220 arranged across the light guide 210. For example, the multibeam elements 220 may be disposed on a surface of the light guide 210 or between opposing surfaces of the light guide 210, in various embodiments. Each multibeam element 220 of the multibeam element array is configured to scatter out a portion of the guided light from the light guide 210 as directional light beams having different directions corresponding to different view directions of the multiview display 200. In some embodiments, the multibeam element 220 of the multibeam element array may be substantially similar to the multibeam element 122 of the above-described multiview backlight 100. Further, the multibeam elements 220 may be arranged as the multibeam element array in an array of multibeam unit cells substantially similar to the array of multibeam unit cells 120, described above. For example, the multibeam element 220 may comprise one or more of a diffraction grating configured to diffractively scatter out the guided light, a micro-reflective element configured to reflectively scatter out the guided light, and a micro-refractive element configured to refractively scatter out the guided light, according to various embodiments.

The illustrated multiview display 200 further comprises an optical mask element 230 corresponding to each of the multibeam elements 220. According to various embodiments, the optical mask element 230 has a first portion aligned and co-extensive with the corresponding multibeam element 220 and a second portion laterally displaced from the first portion. In some embodiments, the lateral displacement is a distance corresponding or equal to an integer multiple of a pixel pitch of the multiview display 200. In other embodiments, the lateral displacement is a non-integer multiple of the pixel pitch. The optical mask element 230 may be configured to reduce or mitigate Moiréassociated with the optical mask elements 230. Reduced or mitigated Moiré may effectively reduce a visibility of the optical mask elements 230, for example.

In some embodiments, the optical mask element 230 may be substantially similar to the optical mask element 124 of the multibeam unit cell 120, described above with respect to the multiview backlight 100. In particular, a combined size of the first and second portions of the optical mask element 230 may be an integer multiple of a square of the pixel pitch, in some embodiments. In some embodiments, the first portion may comprise a reflective material (e.g., a reflective layer) configured to reflect light scattered from the multibeam element 220 in a direction corresponding to the scattered out a portion of the guided light that includes the directional light beams. Further, the second portion may comprise one or both of an opaque material and a reflective material, according to some embodiments.

According to various embodiments, the multiview display 200 further comprises an array of light valves 240, as illustrated in FIG. 7. The array of light valves 240 is configured to modulate the directional light beams scattered out by the multibeam element array to provide a multiview image. In some embodiments, the array of light valves 240 may be substantially similar to the array of light valves 130, as described above with reference to the multiview backlight 100. For example, different types of light valves may be employed as the light valves 240 of the light valve array including, but not limited to, one or more of liquid crystal light valves, electrophoretic light valves, and light valves based on electrowetting, according to various embodiments.

According to some embodiments (not illustrated), the multiview display 200 may further comprise a light source optically coupled to an input of the light guide, the light source being configured to provide the guided light. The guided light provided by the light source may have one or both of a non-zero propagation angle and be collimated according to a predetermined collimation factor. The light source of the multiview display 200 may be substantially similar to the light source 140 of the above-described multiview backlight 100, in some embodiments.

According to some embodiments (as illustrated in FIG. 7), the multiview display 200 may further comprise a broad-angle backlight 250 adjacent to a surface of the light guide 210 opposite to the surface of the light guide 210 adjacent to the light valve array. In some embodiments, the broad-angle backlight 250 may be substantially similar to the broad-angle backlight 150, as described above with respect to the multiview backlight 100. In particular, the broad-angle backlight 250 may be configured to provide broad-angle emitted light 252 during a two-dimensional (2D) mode of the multiview display 200. Further, the light valve array may be configured to modulate the broad-angle emitted light 252 as a 2D image, when the broad-angle backlight is present. Further, the light guide 210 and multibeam element array may be configured to be transparent to the broad-angle emitted light 252. In addition, the multiview display 200 may be configured to display the multiview image during a multiview mode and the 2D image during the 2D mode of the multiview display 200, in some embodiments.

Figure 8:
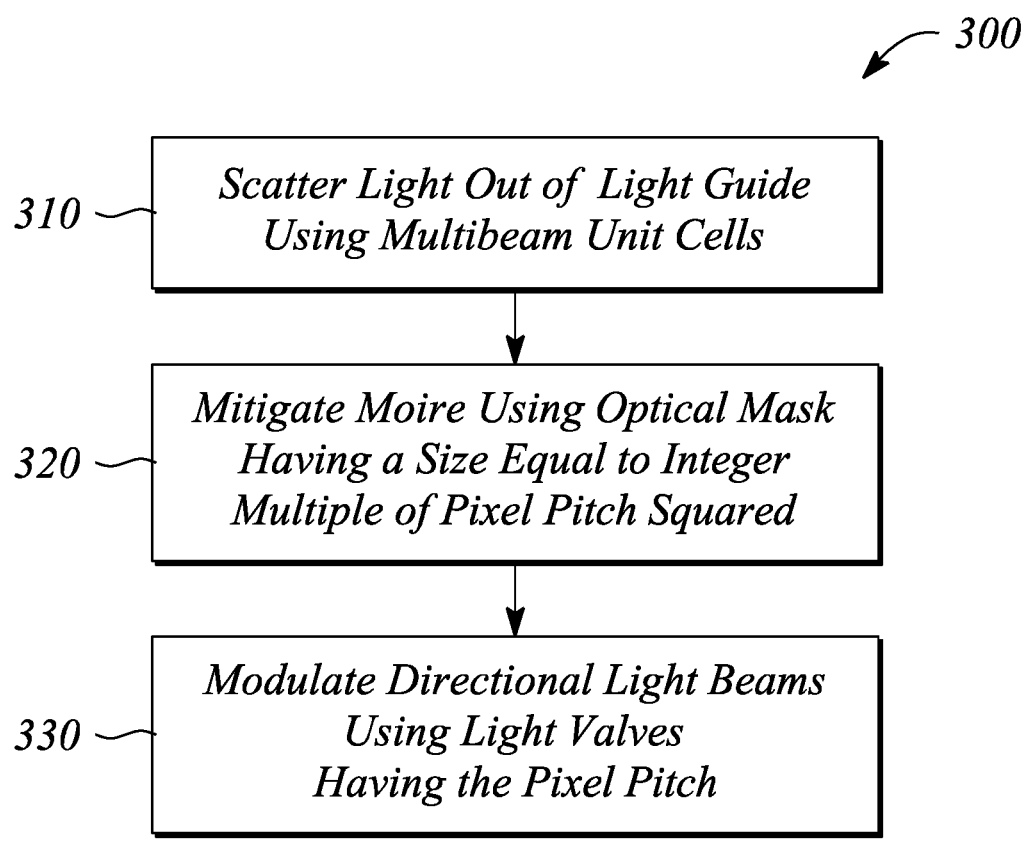
FIG. 8 illustrates a flow chart of a method of multiview backlight operation in an example, according to an embodiment consistent with the principles described herein.

In accordance with other embodiments of the principles described herein, a method of multiview backlight operation is provided. FIG. 8 illustrates a flow chart of a method 300 of multiview backlight operation in an example, according to an embodiment consistent with the principles described herein. As illustrated in FIG. 8, the method 300 of multiview backlight operation comprises scattering 310 guided light out of a light guide using an array of multibeam unit cells to provide directional light beams having directions corresponding to views of a multiview display. According to various embodiments, each multibeam unit cell comprises a multibeam element and an optical mask element. Further, the optical mask element has a first portion aligned and co-extensive with the multibeam element and a second portion laterally displaced from the first portion.

In some embodiments, the multibeam unit cell, multibeam element, and optical mask element may each be substantially similar multibeam unit cell 120, the multibeam element 122, and optical mask element 124, respectively, as described above with respect to the multiview backlight 100. For example, the first portion of the optical mask element may comprise a reflective material configured to reflect light scattered light from the multibeam element in a direction corresponding to the scattered out a portion of the guided light that includes the directional light beams. Further, the second portion of the optical mask element may comprise one or both of an opaque material and a reflective material. In some embodiments, the multibeam element may comprise one or more of a diffraction grating that diffractively scatters out the guided light, a micro-reflective element that reflectively scatters out the guided light, and a micro-refractive element refractively scatters out the guided light. Further, the light guide may be substantially similar to the light guide 110 of the above-described multiview backlight 100. For example, the guided light may be guided according to total internal reflection one or both of at a non-zero propagation angle and having to a predetermined collimation factor.

The method 300 of multiview backlight operation illustrated in FIG. 8 further comprises mitigating 320 Moiréassociated with the multibeam unit cell array. In particular, Moiré is mitigated 320 by providing an overall size of the optical mask element as an integer multiple of a square of a pixel pitch of the multiview display, in some embodiments. Further, in some embodiments, Moiré may be mitigated by laterally displacing the second portion of the optical mask element from the first portion by an integer multiple of the pixel pitch. The pixel pitch the multiview display may be a pixel pitch (or a sub-pixel pitch) of a multiview display that uses the method 300 of multiview backlight operation (i.e., employs the multiview backlight for illumination), according to various embodiments.

In some embodiments, the method 300 of multiview backlight operation further comprises modulating 330 the directional light beams to provide a multiview image that is displayed by the multiview display. In particular, the directional light beams are modulated 330 using an array of light valves having the pixel pitch. In some embodiments, the array of light valves may be substantially similar to the array of light valves 130 described above with respect to the multiview backlight 100.

In some embodiments (not illustrated), the method 300 of multiview backlight operation further comprises providing light to the light guide using a light source. The provided light may one or both of have a non-zero propagation angle within the light guide and be collimated according to a predetermined collimation factor. According to some embodiments, the light source may be substantially similar to the light source 140 described above with respect to the multiview backlight 100.

Thus, there have been described examples and embodiments of a multiview backlight, a multiview display, and a method of multiview backlight operation that employ both optical mask elements multibeam elements to provide directional light beams, the optical mask elements having a first portion and a laterally displaced second portion. The first portion and the laterally displaced second portion of the optical mask elements are configured to reduce or eliminate Moiréassociated with the optical mask elements. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview backlight comprising:
a light guide configured to guide light as guided light; and
an array of multibeam unit cells distributed across the light guide, each multibeam unit cell having a multibeam element configured to scatter out a portion of the guided light as a plurality of directional light beams having different directions corresponding to different views of a multiview display, and an optical mask element having a first portion aligned and co-extensive with the multibeam element and a second portion laterally displaced within the multibeam unit cell from the first portion,
wherein an overall size of the optical mask element is configured to mitigate Moiréassociated with the optical mask element;
wherein the second portion is laterally displaced from the first portion by distance corresponding to an integer multiple of a pixel pitch of the multiview display, and the overall size of the optical mask element comprising a combined area of the first and second portions is an integer multiple of a square of the pixel pitch.

2. The multiview backlight of claim 1, wherein the multibeam element comprises a diffraction grating configured to diffractively scatter out the portion of the guided light as the plurality of directional light beams.

3. The multiview backlight of claim 1, wherein the multibeam element comprises one or both of a micro-reflective element configured to reflectively scatter out the portion of the guided light as the plurality of directional light beams and a micro-refractive element configured to refractively scatter out the portion of the guided light as the plurality of directional light beams.

4. The multiview backlight of claim 1, wherein the first portion of the optical mask element is located between the multibeam element and a second surface of light guide opposite to a first surface of the light guide, the first surface corresponding to an emission surface through which the plurality of directional light beams is configured to be emitted by the multiview backlight.

5. The multiview backlight of claim 1, wherein the first portion of the optical mask element comprises a reflective material configured to reflect scattered light from the multibeam element in a direction corresponding to the scattered out portion of the guided light.

6. The multiview backlight of claim 1, wherein the second portion of the optical mask element comprises an opaque material, the optical mask element being an opaque mask element.

7. The multiview backlight of claim 1, wherein the first and second portions of the optical mask element are co-planar with one another.

8. The multiview backlight of claim 1, further comprising a light source optically coupled to an input of the light guide, the light source being configured to provide the guided light, wherein the guided light has one or both of a non-zero propagation angle and is collimated according to a predetermined collimation factor.

9. A multiview display comprising the multiview backlight of claim 1, the multiview display further comprising an array of light valves having a pixel pitch disposed adjacent to a surface of the light guide, the array of light valves being configured to modulate directional light beams of the plurality of directional light beams to provide a multiview image.

10. The multiview display of claim 9, further comprising a broad-angle backlight adjacent to a surface of the light guide opposite to the surface of the light guide adjacent to the light valve array, the broad-angle backlight being configured to provide broad-angle emitted light during a two-dimensional (2D) mode of the multiview display, the light valve array being configured to modulate the broad-angle emitted light as a 2D image,
wherein the light guide and the array of multibeam unit cells are configured to be transparent to the broad-angle emitted light, the multiview display being configured to display the multiview image during a multiview mode and the 2D image during the 2D mode of the multiview display.

11. A multiview display comprising:
an array of multibeam elements arranged across a light guide, each multibeam element of the multibeam element array being configured to scatter out guided light from the light guide as directional light beams having different directions corresponding to different view directions of the multiview display;
an optical mask element corresponding to each of the multibeam elements, the optical mask element having a first portion aligned and co-extensive with the multibeam element and a second portion laterally displaced from the first portion, wherein an overall size of the optical mask element is configured to mitigate Moiréassociated with the optical mask element; and an array of light valves configured to modulate the directional light beams scattered out by the multibeam element array to provide a multiview image;

wherein the second portion is laterally displaced from the first portion by distance corresponding to an integer multiple of a pixel pitch of the multiview display, and the overall size of the optical mask element comprising a combined area of the first and second portions is an integer multiple of a square of the pixel pitch.

12. The multiview display of claim 11, wherein a combined size of the first and second portions of the optical mask element is an integer multiple of a square of a pixel pitch of the multiview display.

13. The multiview display of claim 11, wherein second portion of the optical mask element is laterally displaced from the first portion by distance equal to an integer multiple of a pixel pitch of the multiview display.

14. The multiview display of claim 11, wherein the first portion comprises a reflective material configured to reflect light scattered from the multibeam element in a direction corresponding to the scattered out portion of the guided light that includes the directional light beams, and wherein the second portion comprises one or both of an opaque material and a reflective material.

15. The multiview display of claim 11, wherein the multibeam element comprises one or more of a diffraction grating configured to diffractively scatter out the guided light, a micro-reflective element configured to reflectively scatter out the guided light, and a micro-refractive element configured to refractively scatter out the guided light.

16. The multiview display of claim 11, further comprising a light source optically coupled to an input of the light guide, the light source being configured to provide the guided light, wherein the guided light has one or both of a non-zero propagation angle and is collimated according to a predetermined collimation factor.

17. The multiview display of claim 11, further comprising a broad-angle backlight adjacent to a surface of the light guide opposite to the surface of the light guide adjacent to the light valve array, the broad-angle backlight being configured to provide broad-angle emitted light during a two-dimensional (2D) mode of the multiview display, the light valve array being configured to modulate the broad-angle emitted light as a 2D image, wherein the light guide and multibeam element array are configured to be transparent to the broad-angle emitted light, the multiview display being configured to display the multiview image during a multiview mode and the 2D image during the 2D mode of the multiview display.

18. A method of multiview backlight operation, the method comprising:

scattering guided light out of a light guide using an array of multibeam unit cells to provide directional light beams having directions corresponding to views of a multiview display, each multibeam unit cell comprising a multibeam element and an optical mask element having a first portion aligned and co-extensive with the multibeam element and a second portion; and mitigating Moiréassociated with the multibeam unit cell array by an overall size of the optical mask element being an integer multiple of a square of a pixel pitch of the multiview display and the second portion being laterally displaced from the first portion;

wherein the second portion is laterally displaced from the first portion by distance corresponding to an integer multiple of a pixel pitch of the multiview display, and the overall size of the optical mask element comprising a combined area of the first and second portions is an integer multiple of a square of the pixel pitch.

19. The method of claim 18, wherein the first portion of the optical mask element comprises a reflective material that reflects scattered light from the multibeam element in a direction corresponding to the directions of the directional light beams, and wherein the second portion of the optical mask element comprises one or both of an optically opaque material and a reflective material.

20. The method of claim 18, further comprising modulating the directional light beams using an array of light valves having the pixel pitch to provide a multiview image that is displayed by the multiview display, wherein the second portion of the optical mask element is laterally displaced from the first portion by an integer multiple of the pixel pitch.

* * * * *

UNITED STATES PATENT AND TRADEMARK OFFICE
CERTIFICATE OF CORRECTION

| | | |
|---|---|---|
| PATENT NO. | : 12,032,178 B2 | Page 1 of 1 |
| APPLICATION NO. | : 17/234495 | |
| DATED | : July 9, 2024 | |
| INVENTOR(S) | : Fattal et al. | |

It is certified that error appears in the above-identified patent and that said Letters Patent is hereby corrected as shown below:

On the Title Page

On page 2, in Column 1, Item (57) under "Abstract", Line 2, delete "Moiréassociated" and insert --Moiré associated-- therefor In the Claims In Column 21, Line 58, in Claim 1, delete "Moiréassociated" and insert --Moiré associated-- therefor In Column 23, Lines 1-2, in Claim 11, delete "Moiréassociated" and insert --Moiré associated-- therefor In Column 24, Line 18, in Claim 18, delete "Moiréassociated" and insert --Moiré associated-- therefor Signed and Sealed this
Twenty-second Day of April, 2025

Coke Morgan Stewart
*Acting Director of the United States Patent and Trademark Office*